United States Patent
Nagasawa

(10) Patent No.: US 7,653,419 B2
(45) Date of Patent: Jan. 26, 2010

(54) MOBILE PHONE WITH POWER SAVING FUNCTION

(75) Inventor: Makoto Nagasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 667 days.

(21) Appl. No.: 10/690,637

(22) Filed: Oct. 23, 2003

(65) Prior Publication Data

US 2004/0087350 A1  May 6, 2004

(30) Foreign Application Priority Data

Oct. 30, 2002  (JP) .............................. 2002-315242

(51) Int. Cl.
*H04M 1/00*   (2006.01)
(52) U.S. Cl. .................... 455/574; 455/572; 455/343.2; 455/343.3; 455/343.4; 455/343.5
(58) Field of Classification Search ................. 455/572, 455/574, 343.1–343.6
See application file for complete search history.

(56) References Cited

U.S. PATENT DOCUMENTS

| | | | |
|---|---|---|---|
| 6,246,891 B1 | 6/2001 | Isberg et al. | |
| 6,560,274 B1 * | 5/2003 | Leitgeb et al. | 375/219 |
| 7,062,303 B2 * | 6/2006 | Guterman | 455/574 |
| 7,289,832 B1 * | 10/2007 | Enoki et al. | 455/574 |
| 2001/0023182 A1 * | 9/2001 | Bach et al. | 455/414 |
| 2002/0049072 A1 * | 4/2002 | Usami | 455/550 |
| 2002/0090931 A1 * | 7/2002 | Papineau et al. | 455/411 |
| 2004/0192412 A1 * | 9/2004 | Ono et al. | 455/574 |
| 2007/0037610 A1 * | 2/2007 | Logan | 455/574 |
| 2007/0060212 A1 * | 3/2007 | Shah | 455/572 |

FOREIGN PATENT DOCUMENTS

| | | |
|---|---|---|
| EP | 1 182 901 A2 | 2/2002 |
| EP | 1 199 900 A2 | 4/2002 |
| FR | 2 820 931 | 8/2002 |
| GB | 2 343 335 | 5/2000 |
| JP | 57-54442 | 3/1982 |
| JP | 4-355524 | 12/1992 |
| JP | 6-69854 | 3/1994 |
| JP | 6-112889 | 4/1994 |
| JP | 7-131404 | 5/1995 |
| JP | 07-264119 | 10/1995 |
| JP | 2000-151455 | 5/2000 |
| JP | 2002-9686 | 1/2002 |
| JP | 2002-158609 | 5/2002 |

OTHER PUBLICATIONS

European Search Report dated May 30, 2005.
Japanese Office Action dated Jan. 22, 2008 (with partial English translation).
Japanese Office Action dated Oct. 16, 2007, with partial English translation.

* cited by examiner

*Primary Examiner*—Edward Urban
*Assistant Examiner*—Fayyaz Alam
(74) *Attorney, Agent, or Firm*—McGinn IP Law Group, PLLC

(57) ABSTRACT

A mobile terminal includes a battery; a power supply block which supplies power of the battery; and a radio communication block which communicates with a base station when the power is supplied from the battery through the power supply block. The mobile terminal further includes a first switch which is interposed between the power supply block and the radio communication block; and a key operation section to which the power is always supplied from the battery through the power supply block. A control unit controls the first switch to stop the power supply from the battery to the radio communication block in response to a manual operation of the key operation section.

9 Claims, 2 Drawing Sheets

MOBILE PHONE WITH POWER SAVING FUNCTION

BACKGROUND OF THE INVENTION

1. Field of the Invention

The present invention relates to a mobile phone, and more particularly to a mobile phone with a power saving function.

2. Description of the Related Art

A recent mobile phone has various functions in addition to an original communication function. For example, a mobile phone is used widely which has application functions such as a schedule managing function, a calculator function, a musical reproducing function, a game function, an alarm (awaking) function, and a digital camera function. In such a mobile phone, a call waiting function is operating while any application function other than the communication function is used.

There is a case that the mobile phone is carried in a travel, because the above-mentioned application functions are provided for the mobile phone. However, when any base station does not exist for the mobile phone, the mobile phone always tries to communicate with the base station at the maximum transmission power. As a result, there is a possibility that a battery is consumed and the time period during which the application function of the mobile phone can be used becomes short extremely. The power consumption of the battery can be avoided, even if the power is turned on only for the use of the application function and the power is turned off after the use. However, during the use of the alarm (awaking) function, the power supply cannot be switched off.

As the power saving function of the mobile phone, a method is known in which the power supply is switched off while a call signal to a mobile phone other than the mobile phone of a user is received, as disclosed in Japanese Laid Open Patent Application (JP-A-Showa 57-54442). According to this method, the call signal to the mobile phone of the user is used as a trigger and the power supply of the mobile phone is switched off until the reception of call signal. Also, a method is known in which all the reception operations are stopped for a predetermined time when input electric field becomes continuously lower than a predetermined level in the receiving operation, as disclosed in Japanese Laid Open Patent Application (JP-A-Heisei 4-355524).

In the above-mentioned conventional techniques, it is necessary to carry out the reception of the call signal intermittently. Therefore, it is impossible to switch off the power supply continuously. Also, in the above-mentioned conventional techniques, there is no description about the mobile phone with the application functions other than the communication function. The measure to the above-mentioned situation is not considered.

In conjunction with the above description, a cordless telephone apparatus is disclosed in Japanese Laid Open Patent Application (JP-A-Heisei 6-69854). The codeless telephone apparatus of this conventional example consists of a parent apparatus connected with a telephone line in a wire, and a child apparatus connected with the telephone line through the parent apparatus to which is connected in a radio channel. The child apparatus has a battery, and receives a control signal from the parent apparatus intermittently such that the connection and disconnection of the battery is controlled. The child apparatus contains a plurality of period generation sections generating a plurality of intermittent reception periods. A period selection section selects one of the period generation sections for a necessary intermittent reception period. A microcomputer controls all kinds of operations of the child apparatus. The child apparatus further contains a switch to inform the stop of the reception from the parent apparatus to the microcomputer, and a timer as a 24-hour timer. A switching time storage section stores a time for the period generation section to be switched, a time for the operation to be switched from the intermittent reception from the parent apparatus to the receiving operation stop, or a time for the operation to be switched from the receiving operation stop to the intermittent reception from the parent apparatus. In the child apparatus, in case that the reception is not stopped, the period selection section selects one of the period generation sections based on a time measured by the timer and the switching time stored in the switching time memory to switch into the intermittent reception period. In case that the reception is stopped, the period selection section selects one of the period generation sections based on a time measured by the timer and the switching time stored in the switching time memory to switch from the intermittent reception operation into the reception stop operation.

Also, a cordless telephone apparatus is disclosed in Japanese Laid Open Patent Application (JP-A-Heisei 6-112889). This conventional example is composed of a plurality of parent apparatuses and child apparatuses. While the child apparatus is in a call waiting state, a control unit does not carry out confirmation of an area of the child apparatus through the parent apparatuses. While the child apparatus is in a communication state, the control unit changes the parent apparatuses from one into another in accordance with a reception level of a communication channel.

Also, a variable intermittent reception system in a mobile communication is disclosed in Japanese Laid Open Patent Application (JP-A-Heisei 7-131404). A mobile terminal of this conventional example is composed of a radio receiving section, a timing generating section which generating a timing signal for the receiving operation of the radio receiving section, a memory which stores a scheduled time, a timer, and a control unit. When the timer indicates the scheduled time, the control unit controls the timing generating section such that an intermittent reception ratio is increased.

Also, a mobile communication system with an emergency signal transmitting and receiving function is disclosed in Japanese Laid Open Patent Application (JP-P2002-9686A). This conventional example is relates to a mobile communication system of a mobile phone of a PDC method, various CDMA methods and a mobile terminal of PHS. The mobile terminal has an emergency signal transmission section which sends an emergency signal through an operation of the mobile terminal when the mobile terminal is in a communication area of a base station and is not in the communication area thereof. The base station has an emergency signal response processor which receives the emergency signal from the mobile terminal and notifies to a center which has an urgent time mobile terminal situation display section which receives the emergency signal from the base station and displays the contents of the emergency signal and specifies the position of the mobile terminal. A moving base station has a center having a terminal situation display mechanical section which receives the emergency signal, and displays the contents of the emergency signal and specifies the position of the mobile terminal.

Also, a method of switching to a power saving mode in a radio communication system is disclosed in Japanese Laid Open Patent Application (JP-P2002-158609A). In this conventional example, a TDMA radio communication system is composed of a base station and a plurality of terminal stations. The base station transmits a power saving mode switching instruction to the plurality of terminal stations. Each of the terminal stations receives the power saving mode switching instruction and changes into an intermittent reception operation, after transmitting the state of the terminal station and confirmation of the reception of the switching instruction to the base station. When receiving the state of the terminal station and confirmation of the reception of the switching instruction from each of the terminal stations, the base station changes from a continuation transmission operation of information into an intermittent transmission operation and into an intermittent reception operation.

SUMMARY OF THE INVENTION

Therefore, an object of the present invention is to provide a mobile phone in which an application function usable time can be extended largely.

Another object of the present invention is to provide a mobile phone in which the consumption of a battery in the call waiting operation can be avoided even when the mobile phone is not present in a communicable area.

In an aspect of the present invention, a mobile terminal includes a battery; a power supply block which supplies power of the battery; and a radio communication block which communicates with a base station when the power is supplied from the battery through the power supply block. The mobile terminal further includes a first switch which is interposed between the power supply block and the radio communication block; and a key operation section to which the power is always supplied from the battery through the power supply block. A control unit controls the first switch to stop the power supply from the battery to the radio communication block in response to a manual operation of the key operation section.

Here, the mobile terminal may further include a base band block to which the power is always supplied from the battery through the power supply block and is possible to accomplish application functions other than a communication function using the radio communication block. In this case, the mobile terminal may further include a second switch (111) which is interposed between the base band block and the radio communication block. The control unit is contained in the base band block and controls the second switch to disconnect the base band block from the radio communication block.

Also, the mobile terminal may further include a base band block which is connected with the first switch. The power supply to the base band block is stopped when the control unit controls the first switch to stop the power supply from the battery to the radio communication block in response to the manual operation of the key operation section. In this case, the mobile terminal may further include an application function block to which the power is always supplied from the battery through the power supply block and is possible to accomplish application functions. Also, the mobile terminal may further include a second switch which is interposed between the application function block and the base band block. The control unit may be contained in the application function block and control the second switch to disconnect the base band block from the application function block.

Also, the control unit may control the first switch to be turned on in response to a manual operation of a key of the key operation section. Alternately the control unit may include a timer to which a predetermined time is set, and when the timer measures the predetermined time, the control unit may control the first switch to be turned on.

In another aspect of the present invention, a power saving method in a mobile terminal is achieved by supplying power of a battery to a radio communication block through a first switch and directly to a key operation section, the radio communication block communicating with a base station; and by controlling the first switch to stop the power supply from the battery to the radio communication block in response to a manual operation of a key of the key operation section, such that the communication with the base station by the radio communication block is stopped.

Here, a base band process may be carried out by a base band block to communicate with the base station through the radio communication block, when the power is supplied from the battery to the radio communication block. The base band block is desirably possible to accomplish application functions. The base band block may be disconnected from the radio communication block in response to the manual operation of the key of the key operation section.

Also, in the power supply, the power of the battery may be supplied to a base band block in addition to the radio communication block, and in the control, the first switch may be controlled to stop the power supply from the battery to the base band block in addition to the radio communication block in response to the manual operation of the key operation section. In this case, a base band process may be carried out by the base band block to communicate with the base station through the radio communication block, when the power is supplied from the battery to the radio communication block. Also, application functions may be carried out by an application function block, and the application function block may be disconnected from the base band block in response to the manual operation of the key of the key operation section.

Also, the first switch may be controlled to be turned on in response to a manual operation of a key of the key operation section. Alternately, the first switch may be controlled to be turned on, when a timer measures a predetermined time after the power supply to the radio communication block is stopped.

DESCRIPTION OF THE PREFERRED EMBODIMENTS

Hereinafter, the present invention will be described with reference to the attached drawings.

Figure 1:
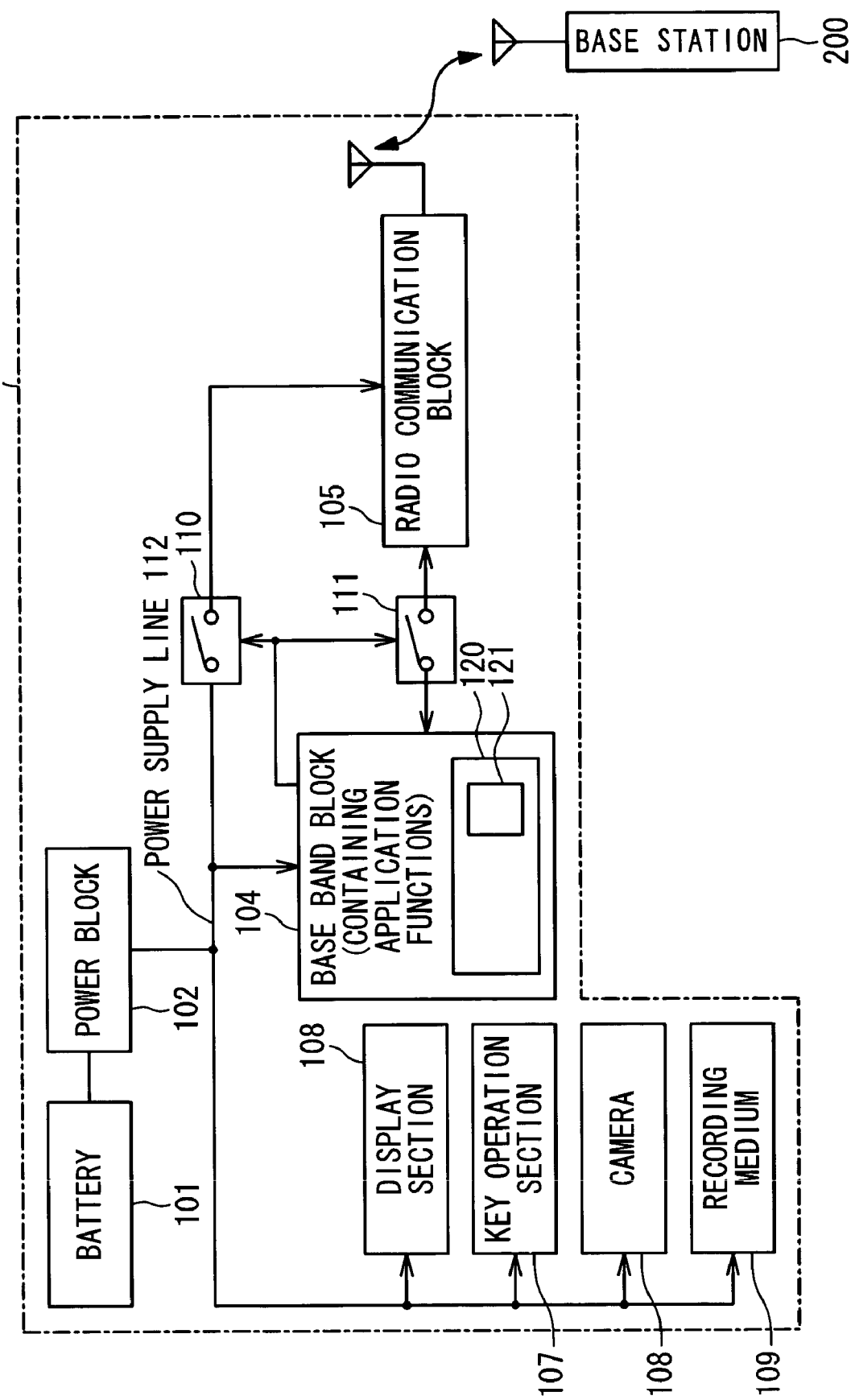
FIG. 1 is a block diagram showing a mobile terminal according to a first embodiment of the present invention.

FIG. 1 is a schematic functional block diagram showing the mobile terminal according to the first embodiment of the present invention. The mobile terminal 100 in this embodiment is composed of a battery 101, a power supply block 102, a base band block 104, a radio communication section 105, an LCD display section 106, a key operation part 107, a camera section 108, a recording medium 109, first and second switches 110 and 111 and a power supply line 112.

The battery 101 is a secondary battery which is chargeable and a power supply of the mobile terminal 100. The battery block 102 supplies the power of this battery 101 to each section of the mobile terminal through the power supply line 112 and controls the charging operation to the battery 101. The base band block 104 has a control unit 120. The control unit 120 may have a timer 121. The control unit 120 has a function to accomplish a base band process of a communication signal and data. The control unit 120 of the base band block 104 also has various application functions other than the communication function. For example, the base band block 104 has a schedule managing function, a calculator function, a reproduction function of music recorded in a recording medium 109, a game function, an alarm function, an image processing function using the camera 108 and so on. When a key of the key operation section is manually operated by a user, the control unit 120 of the base band block 104 controls the switches 110 and 110.

The radio communication block 105 has a radio communication function with the base stations 200. The display section 106 is an LCD display and visibly displays data to the user. The key operation section 107 is an interface with the user and contains various keys. The camera 108 has a CCD imaging function, and the recording medium 109 has a detachable structure to the mobile terminal 100 such as a SD card and a memory stick. The recording medium 109 stores musical data and picture data taken from the camera 108.

The first switch 110 is a switch which is turned on or off in response to a control signal from the control unit 120 of the base band block 104 to control the power supply to the radio communication block 105 from the power supply block 102. The second switch 111 is a switch which is turned on or off in response to the control signal from the base band block 104 to control communication between the base band block 104 and the radio communication block 105.

In this structure, generally, the switches 110 and 111 are both turned on under the control of the base band block 104, and the power supply block 102 supplies power to the radio communication block 105, when the mobile terminal is in a communicable area of the base station 200 around the mobile terminal. At the same time, the radio communication block 105 communicates with the base station 200 intermittently in accordance with the control of the control unit 120 of the base band block 104 and is in the call waiting state. Thus, the operation of the reception and the transmission is possible, and the base band block 104 can accomplish the operation of various application functions. In this state, the power consumption of the battery 101 becomes large, and the operable time of the application function reduces.

The mobile terminal 100 with such application functions is frequently used by the user in a non-communicable area with a base station, e.g., in another country. As mentioned above, the mobile terminal 100 always tries to communicate with a base station around it intermittently. Therefore, the radio communication block 105 transmits a signal to the base station at the maximum transmission power, even if the communication is impossible due to the non-communicable area. Therefore, the power consumption of the battery 101 becomes maximum and the operable time of the application function is reduced.

In order to avoid such a situation, when the user with the mobile terminal 100 is present in the non-communicable area, the user operates the key operation section 107 manually to issue a power save instruction. The control unit 120 of the base band block 104 controls the switches 110 and 111 to be turned off in response to the power save instruction. Thus, the power supply to the radio communication block 105 is stopped. At the same time, the control unit 120 of the base band block 104 controls the radio communication block 105 such that its operation stops. Thus, the wasteful power consumption in the radio communication block 105 is reduced and the operable time of the application function can be extended largely.

Such an operation is realized by manually operating a key of the key operation section 107 by the user of the mobile terminal 100 such that the control unit 120 of the base band block 104 detects the operation and generates an off control signal for the switches 110 and 111. When the switches 110 and 111 are turned off, the power supply from the power supply block 102 to the radio communication block 105 is stopped, and the power consumption of the battery can be reduced largely. Also, the operation of the radio communication block 105 is stopped by the base band block 104. As a result, an operation performance of the base band block 104 is improved and the operation of the application function can be more smoothly.

It should be noted that when the user of the mobile terminal 100 returns from a non-communicable area such as a foreign country to a communicable area, the user manually operates a key of the key operation section 107 to issue an operation restart instruction to the control unit 120 of the base band block 104. The control unit 120 turns on the switches 110 and 111 in response to the operation restart instruction from the key operation section 107 by the user of the mobile terminal inn. Thus, the communication become possible.

Figure 2:
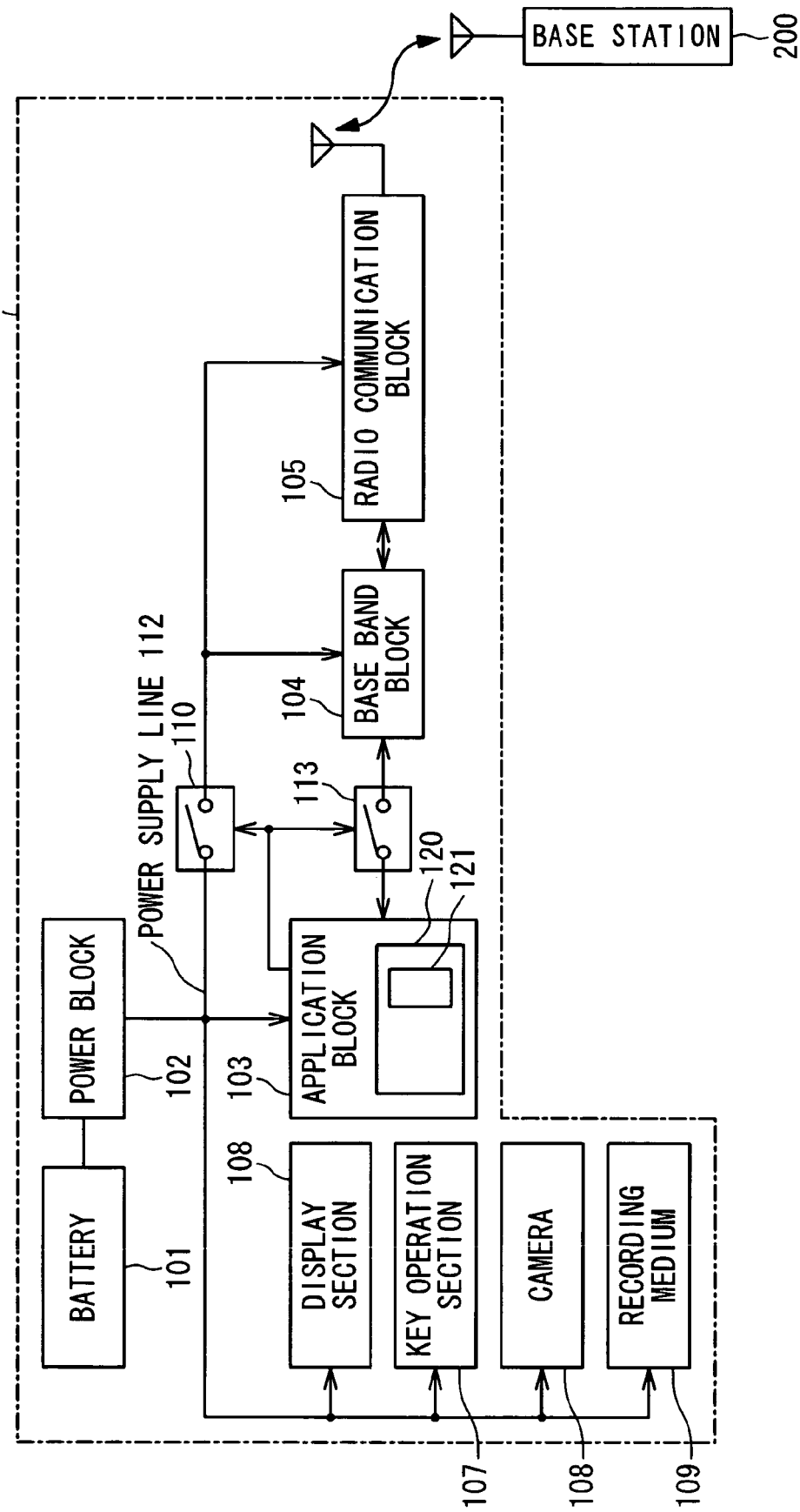
FIG. 2 is a block diagram showing the mobile terminal according to a second embodiment of the present invention.

FIG. 2 is a schematic block diagram of the mobile terminal according to the second embodiment of the present invention. The same components as those shown in FIG. 1 are allocated with the same numerals.

The second embodiment shown in FIG. 2 is different from the first embodiment shown in FIG. 1 in that an application block 103 is separated from the base band block 104, the first switch 110 as a power supply switch is provided to control the power supply to the base band block 104 in addition to the radio communication block 105. Also, the second switch 113 is provided to control the connection between the application block 103 and the base band block 104. Also, the second embodiment is different from the first embodiment in that the control unit 120 is provided for the application function block 103 to have a timer 121, and the switching operations of the switches 110 and 113 are controlled by the control unit 120 of the application block 103. The other structure is the same as that of FIG. 1 and the explanation is omitted.

In the first embodiment of FIG. 1, the application functions are contained in the base band block 104. However, the processing of the data in the base band block 104 becomes complex when a lot of application functions are loaded. Therefore, in the second embodiment of FIG. 2, the function of the base band block 104 is restricted to the control of the radio communication block 105, and the data processing function other than the control function of the radio communication block 105 is accomplished by the application block 103.

In such a structure, like the first embodiment, when the user is present in the non-communicable area, the power supply to the base band block 104 and the radio communication block 105 is stopped through the operation of the key operation section 107 by the user. Also, the control to the base band block 104 by the application block 103 is stopped. The power consumption of the battery through wasteful communication can be prevented, and the operable time of the application function can be extended largely.

It should be noted that when the application block 103 can operate separately and independently from the operation of the base band block 104, the switch 113 is unnecessary, of course, the connection between them is unnecessary originally.

In the above embodiments, the switches 110, 111 and 113 are turned on by the control unit 120 through the manual operation of the key operation section 107 by the user. However, a predetermined time is set to the timer 121. When reaching the predetermined time, the timer 121 may issue a time reach signal to the control unit 120. The control unit 120 controls the switches 110 and 111 in the first embodiment and switches 110 and 113 in the second embodiment such that the power supply to the radio communication block 105 and the base band block 104 can be automatically restarted.

Also, in the above description, the user operates the key operation section 107 to stop the power supply to the radio communication block when the user is in the non-communicable area. However, the user may operate the key operation section 107 to stop the power supply to the radio communication block even when the user is in the communicable area.

As described above, according to the present invention, when the user of the mobile terminal is present in the non-communicable area with the base station, the operations of the radio communication block and the base band block are unnecessary. Therefore, the switches are provided to make it possible to stop the power supply to the blocks based on an intension of the user. In this way, the operable time of the application function can be extended largely and the operation performance can be improved.

What is claimed is:

1. A mobile terminal comprising:

a battery;

a power supply block which supplies power of said battery;

a radio communication block which communicates with a base station when said power is supplied from said battery through said power supply block, said radio communication block having both a transmission function and a reception function;

a first switch which is interposed between said power supply block and said radio communication block;

a key operation section to which said power is always supplied from said battery through said power supply block;

a control unit which controls said first switch to stop the power supply from said battery to said radio communication block to stop communication between the mobile terminal and the base station in response to a manual operation of said key operation section;

a base band block which is connected with said first switch and said radio communication block;

an application function block to which said power is always supplied from said battery through said power supply block and is possible to accomplish application functions, at least one said application function being selectively associated with a communication involving said radio communication block; and a second switch which is interposed between said application function block and said base band block, wherein the power supply to said base band block is stopped when said control unit controls said first switch to stop the power supply from said battery to said radio communication block in response to said manual operation of said key operation section, and wherein said control unit is contained in said application function block and controls said second switch to disconnect said base band block from said application function block.

2. The mobile terminal according to claim 1, wherein said control unit controls said first switch to turn back on said power in response to a manual operation of a key of said key operation section.

3. The mobile terminal according to claim 1, wherein said control unit comprises a timer to which a predetermined time is set, and when said timer measures the predetermined time, said control unit controls said first switch to turn on.

4. A mobile terminal, comprising:

a battery;

a power supply block which supplies power of said battery;

a radio communication block which communicates with a base station when said power is supplied from said battery through said power supply block, said radio communication block having both a transmission function and a reception function;

a first switch interposed between said power supply block and said radio communication block;

a key operation section to which said power is always supplied from said battery through said power supply block;

a base band block to which said power is always supplied from said battery through said power supply block which accomplishes application functions other than a communication function using said radio communication block, at least one said application function in said base band block being selectively associated with a communication involving said radio communication block;

a second switch interposed between said base band block and said radio communication block; and a control unit which is responsive to a manual operation from said key operation section that controls said first switch to stop the power supply from said battery to said radio communication block, and controls said second switch to stop communication between said base band block and said radio communication block.

5. The mobile terminal according to claim 4, wherein the control unit controls said first switch to stop communication between the mobile terminal and the base station.

6. The mobile terminal according to claim 4, wherein the control unit controls said second switch to stop communication between the mobile terminal and the base station.

7. The mobile terminal according to claim 4, wherein the control unit controls said second switch to disconnect said base band block from said radio communication block.

8. The mobile terminal according to claim 4, wherein said control unit comprises a timer to which a predetermined time is set, and when said timer measures the predetermined time, said control unit controls at least one of said first and second switches to turn said power back on.

9. The mobile terminal according to claim 4, wherein said control unit controls said first and second switch to turn back on said power in response to a manual operation of a key of said key operation section.

* * * * *